Figure 1:
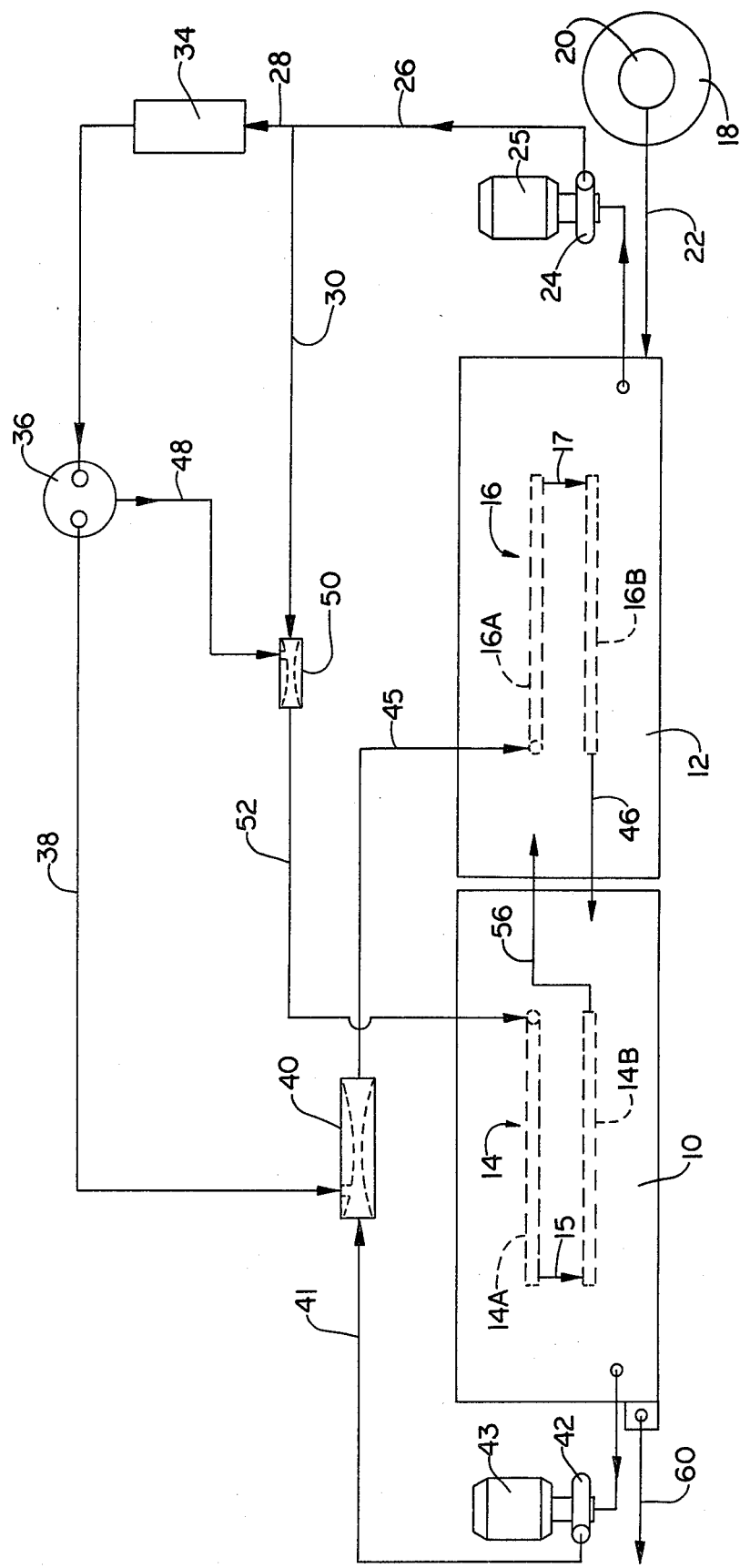

United States Patent [19]

Dietrick

[11] 4,381,971

[45] May 3, 1983

[54] DISTILLATION SYSTEM

[76] Inventor: Gerald P. Dietrick, 523 Ridgeview Dr., Florence, Ky. 41042

[21] Appl. No.: 331,258

[22] Filed: Dec. 16, 1981

[51] Int. Cl.³ .............................................. B01D 3/10
[52] U.S. Cl. .................................. 202/205; 202/233; 202/234; 202/235; 203/DIG. 14
[58] Field of Search .............................. 203/21, 22–27, 203/DIG. 14, 71, 73, 75, 77, 78, 80, 81, 82, 84, 203/91, 94, 98, 10, 11; 202/163, 197, 185 A, 204, 202/205, 232–235; 159/1 C, 165, DIG. 16, DIG. 32, DIG. 40

[56] References Cited

U.S. PATENT DOCUMENTS 3,468,761 9/1969 Stalcup ........................ 203/DIG. 14
3,763,020 10/1973 Drew et al. ................. 203/DIG. 14

Primary Examiner—Frank Sever
Attorney, Agent, or Firm—James W. Pearce; Roy F. Schaeperklaus

[57] ABSTRACT

A water distillation system which includes a storage tank for impure water and a storage tank for distilled water. Impure water is pumped through a heater to an evaporator. Impure water is also pumped through an impure water jet ejector. Distilled water is pumped through a distilled water jet ejector. The impure water jet ejector withdraws water from the bottom of the evaporator. The distilled water jet ejector withdraws water vapor from the top of the evaporator. Distilled water from the distilled water jet ejector passes through a heat exchanger in the impure water tank to heat input water. Impure water from the impure water jet ejector passes through a heat exchanger in the distilled water tank to cool the distilled water.

3 Claims, 2 Drawing Figures

DISTILLATION SYSTEM

This invention relates to a distillation system for manufacture of distilled water from impure or brackish water.

An object of this invention is to provide such a system in which heat available from condensate is used to preheat impure feed water.

A further object of this invention is to provide such a system in which jet ejectors serve to impress a vacuum on an evaporator in which the impure water is distilled.

Briefly, this invention provides a distillation system which includes two tanks, one for storage of distilled water and one for storage of impure water. A heat exchanger is provided in each of the tanks. Impure water is pumped by an impure water pump from the impure water tank and is directed partly to an impure water jet ejector and partly through a heater to an evaporator. Distilled water from the distilled water tank is pumped through a distilled water jet ejector by a distilled water pump. The distilled water jet ejector withdraws water vapor from the evaporator and discharges through the heat exchanger in the impure water tank so that the impure water is heated by heat from the water vapor. The heat exchanger in the impure water tank discharges into the distilled water tank. The impure water jet ejector withdraws excess impure water from the bottom of the evaporator and discharges through the heat exchanger in the distilled water tank so that the water in the distilled water tank is cooled by the excess impure water. The heat exchanger in the distilled water tank discharges into the impure water tank.

Figure 2:
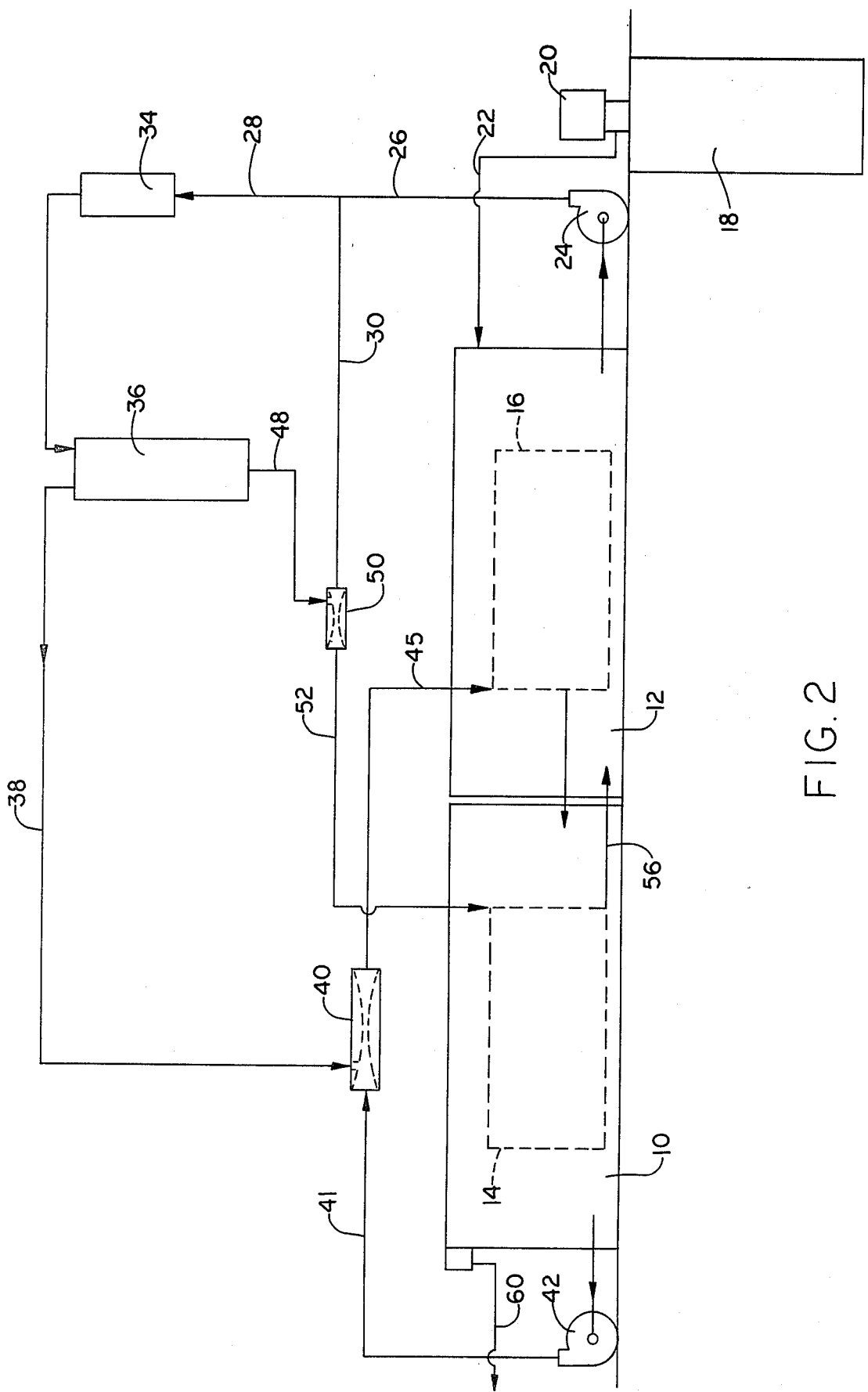

The above and other objects and features of the invention will be apparent to those skilled in the art to which this invention pertains from the following detailed description and the drawings, in which:

FIG. 1 is a schematic top plan view of a distillation system constructed in accordance with an embodiment of this invention; and FIG. 2 is a schematic view in side elevation of the system shown in FIG. 1.

In the following detailed description and the drawings, like reference characters indicate like parts.

In FIGS. 1 and 2 is shown a water distillation system which includes a distilled water tank 10 and an impure water tank 12. In the distilled water tank 10 is mounted a first plate coil heat exchanger 14. The heat exchanger 14 can include two plate sections 14A and 14B, which are connected to each other by a line 15. In the impure water tank 12 is mounted a second plate coil heat exchanger 16. The heat exchanger 16 can include plate sections 16A and 16B, which are connected to each other by a line 17. Makeup water, which can be brackish or impure water at an ambient temperature such as approximately 60 degrees F., is drawn from a make-up sump 18 and is pumped by a sump pump 20 through a line 22 into the impure water tank 12.

Impure water from the impure water tank 12 is pumped by an impure water pump 24 along a line 26. The pump 24 can be driven by a motor 25, which can be a 3 horse power motor. The line 26 feeds impure water to an evaporator branch 28 and an ejector branch 30. Approximately two-thirds of the impure pumped water from the line 26 passes along the ejector branch 30 and one-third of the impure pumped water from the line 26 passes along the evaporator branch 28 through a heater 34 to an evaporator 36. The heater 34 can heat the impure water which passes therethrough to an elevated temperature such as 120 degrees F.

Water vapor from the evaporator 36 is withdrawn through a line 38 by a side arm of a distilled water jet ejector 40. Distilled water from the distilled water tank 10 is directed by a distilled water pump 42 through a line 41 and the distilled water jet ejector 40. The pump 42 can be driven by a motor 43, which can be a 5 horse power motor. Discharge from the distilled water jet ejector 40 is directed through a line 45 and the plate coil heat exchanger 16 in the impure water tank 12 to heat the water in the impure water tank to a temperature of about 100 degrees F. The plate coil heat exchanger 16 discharges through a line 46 into the distilled water tank 10.

Bottoms from the evaporator 36 are withdrawn through a line 48 by a side arm of an impure water jet ejector 50. The impure water jet ejector 50 is powered by the ejector branch 30. The impure water jet ejector 50 discharges through a line 52 and through the plate coil heat exchanger 14 in the distilled water tank 10. The heat exchanger 14 can serve to cool the distilled water in the tank 10 to a temperature of about 100 degrees F. The plate coil heat exchanger 14 discharges through a line 56 into the impure water tank 12. Distilled water can be withdrawn from the distilled water tank 10 through a line 60 for use, as in a greenhouse or otherwise.

As impurities build up in the impure water storage tank, portions of the impure water in the impure water storage tank can be withdrawn to limit the build-up.

The water distillation system illustrated in the drawings and described above is subject to structural modification without departing from the spirit and scope of the appended claims.

Having described my invention, what I claim as new and desire to secure by Letters Patent is:

1. A water distillation system which comprises a storage tank for impure water, a storage tank for distilled water, an impure water jet ejector, impure water pump means for withdrawing impure water from the impure water storage tank, means for directing a portion of the impure water from the impure water pump means to power the impure water jet ejector, a heater, means for directing another portion of the impure water from the impure water pump means to the heater, an evaporator, means for directing heated impure water from the heater to the evaporator, means connecting the bottom of the evaporator to a side arm of the impure water jet ejector, a heat exchanger in the distilled water storage tank, means for directing discharge from the impure water jet ejector through the heat exchanger in the distilled water storage tank to cool the contents of the distilled water storage tank, means for directing discharge from the heat exchanger in the distilled water tank into the impure water storage tank, a distilled water jet ejector, a distilled water pump means for withdrawing distilled water from the distilled water storage tank, means for directing the distilled water from the distilled water pump means to power the distilled water jet ejector, means for withdrawing vapor from the evaporator and for directing the vapor from the evaporator to a side arm of the distilled water jet ejector, a heat exchanger in the impure water storage tank, means for directing discharge from the distilled water jet ejector through the heat exchanger in the impure water storage tank to heat the contents of the impure water storage tank, means for directing discharge from the heat exchanger in the impure water tank into the distilled water storage tank, means for withdrawing distilled water from the distilled water storage tank, and means for supplying impure water to the impure water storage tank.

2. A water distillation system which comprises a storage tank for impure water, a storage tank for distilled water, pump means for pumping impure water from the impure water tank, an impure water jet ejector, means directing impure water from the impure water pump to the impure water jet ejector to power the impure water jet ejector, a heater, an evaporator, means directing impure water from the impure water pump through the heater to the evaporator, the impure water jet ejector withdrawing water from the bottom of the evaporator, a distilled water pump for pumping distilled water from the distilled water tank, a distilled water jet ejector, means directing distilled water from the distilled water pump to the distilled water jet ejector to power the distilled water jet ejector, the distilled water jet ejector withdrawing water vapor from the top of the evaporator, a first heat exchanger in the impure water storage tank, a second heat exchanger in the distilled water storage tank, means for directing discharge from the distilled water jet ejector through the heat exchanger in the impure water storage tank to heat the impure water, and means for directing discharge from the impure water jet ejector through the heat exchanger in the distilled water storage tank to cool the distilled water.

3. A system as in claim 2 which includes means for withdrawing distilled water from the distilled water storage tank, and means for supplying impure water to the impure water storage tank.

* * * * *